US011297098B2

(12) United States Patent
Banerjee et al.

(10) Patent No.: US 11,297,098 B2
(45) Date of Patent: Apr. 5, 2022

(54) DDOS DEFENCE IN A PACKET-SWITCHED NETWORK

(71) Applicant: Telefonaktiebolaget LM Ericsson (publ), Stockholm (SE)

(72) Inventors: Arindam Banerjee, Howrah (IN); Shivashankar Subramanian, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 256 days.

(21) Appl. No.: 16/083,167

(22) PCT Filed: Mar. 10, 2016

(86) PCT No.: PCT/IN2016/050083
§ 371 (c)(1),
(2) Date: Sep. 7, 2018

(87) PCT Pub. No.: WO2017/154012
PCT Pub. Date: Sep. 14, 2017

(65) Prior Publication Data
US 2019/0098043 A1    Mar. 28, 2019

(51) Int. Cl.
*H04L 29/06*    (2006.01)
*H04L 12/00*    (2006.01)
(Continued)

(52) U.S. Cl.
CPC ......... *H04L 63/1458* (2013.01); *G06N 7/005* (2013.01); *G06N 20/00* (2019.01);
(Continued)

(58) Field of Classification Search
CPC ............. H04L 63/1458; H04L 63/1425; H04L 63/1416; H04L 43/08; H04L 43/16;
(Continued)

(56) References Cited

U.S. PATENT DOCUMENTS 7,877,806 B2    1/2011 Repasi et al.
8,881,281 B1 *  11/2014 Mitchell ............... G06F 21/552
726/23
(Continued)

OTHER PUBLICATIONS

M. Barati, A. Abdullah, N. I. Udzir, R. Mahmod and N. Mustapha, "Distributed Denial of Service detection using hybrid machine learning technique," 2014 International Symposium on Biometrics and Security Technologies (ISBAST), Kuala Lumpur, 2014, pp. 268-273.*

(Continued)

*Primary Examiner* — Matthew T Henning
(74) *Attorney, Agent, or Firm* — Christopher & Weisberg, P.A.

(57) ABSTRACT

A method, network system and computer storage medium for DDoS defence in a packet-switched network are provided. The method is performed by a network system and includes: measuring a plurality of network parameters in incoming network traffic; ranking the plurality of measured network parameters based on machine learning; measuring a subset of the plurality of network parameters in incoming network traffic; determining an incoming network packet to be part of a DDoS attack or not by machine learning of the subset of the plurality of network parameters; and blocking an incoming network packet when the incoming network packet is determined to be part of a DDoS attack.

19 Claims, 6 Drawing Sheets

(51) Int. Cl.
  *G06N 20/00* (2019.01)
  *G06N 7/00* (2006.01)
  *H04L 41/142* (2022.01)
  *H04L 41/14* (2022.01)
  *H04L 43/08* (2022.01)
  *H04L 43/16* (2022.01)

(52) U.S. Cl.
  CPC ............ *H04L 12/00* (2013.01); *H04L 41/142* (2013.01); *H04L 41/145* (2013.01); *H04L 43/08* (2013.01); *H04L 43/16* (2013.01); *H04L 63/1416* (2013.01); *H04L 63/1425* (2013.01)

(58) Field of Classification Search
  CPC ..... H04L 41/142; H04L 41/145; G06N 7/005; G06N 20/00–20
  See application file for complete search history.

(56) References Cited

U.S. PATENT DOCUMENTS

| | | | |
|---|---|---|---|
| 2005/0125195 A1 | 6/2005 | Brendal | |
| 2005/0249214 A1* | 11/2005 | Peng | H04L 63/1458 709/224 |
| 2006/0075084 A1* | 4/2006 | Lyon | H04L 65/104 709/223 |
| 2007/0280114 A1 | 12/2007 | Chao et al. | |
| 2008/0086434 A1 | 4/2008 | Chesla | |
| 2015/0047042 A1* | 2/2015 | Haikney | H04L 63/1458 726/23 |
| 2015/0312273 A1 | 10/2015 | Pappu et al. | |
| 2017/0257388 A1* | 9/2017 | Addepalli | G06N 20/10 |

OTHER PUBLICATIONS

K. Li, W. Zhou, P. Li, J. Hai and J. Liu, "Distinguishing DDoS Attacks from Flash Crowds Using Probability Metrics," 2009 Third International Conference on Network and System Security, 2009, pp. 9-17.*

T. Swaroopa Rani, V. Sindhura, G. RamaKoteswara Rao and K. Pranathi, "Discerning Flooding Attack from Flash Crowd based on traffic patterns using entropy detection method," 2015 IEEE International Conference on Electrical, Computerand Communication Technologies (ICECCT), 2015, pp. 1-6.*

European Search Report dated Sep. 19, 2019 for Application No. 16893364.6, consisting of 7 pages.

Seufert, S. et al. "Machine Learning for Automatic Defence against Distributed Denial of Service Attacks"; Proceedings of the 2007 IEEE International Conference on Communications, Glasgow, UK, Jun. 24-28, 2007, consisting of 6—pages.

International Search Report and Written Opinion dated Jul. 25, 2016 for International Application No. PCT/N2016/050083 filed on Mar. 10, 2016, consisting of 8—pages.

Clegg, Richard G. "A Practical Guide to Measuring the Hurst Parameter" Department of Mathematics, University of York, YO10 5DD; arXiv:math/0610756v1[math.ST] Oct. 25, 2006, consisting of 12—pages.

* cited by examiner

DDOS DEFENCE IN A PACKET-SWITCHED NETWORK

CROSS-REFERENCE TO RELATED APPLICATIONS

This application is a Submission Under 35 U.S.C. § 371 for U.S. National Stage Patent Application of International Application Number: PCT/IN2016/050083, filed Mar. 10, 2016 entitled "DDOS DEFENCE IN A PACKET-SWITCHED NETWORK," the entirety of which is incorporated herein by reference.

TECHNICAL FIELD

The invention relates to a method for DDoS defence in a packet-switched network, and a network system, a computer program and a computer program product therefor.

BACKGROUND

A Denial of Service (DoS) attack is an attempt by an attacker to prevent legitimate users of a service from using the service, e.g. by intentionally saturating or exhausting system resources or setting the system providing the service in a fault mode in order to maliciously manipulate the system.

Generally speaking, DoS attacks can be categorized into two groups; semantic attacks and brute force attacks. The semantic attacks aim at flaws of communication protocols (or their implementations) utilized in the system and send malformed or bogus packets to subvert the legitimate communications, e.g. Teardrop attacks, Ping of death, Border Gateway Protocol (BGP) poisoning. The brute force attacks aim at congesting a victim's network, exhausting network buffers or the victim's central processing unit (CPU) resources, by flooding a target with a massive amount of malicious packets (which in themselves could be correctly formed). This kind of attacks usually involves many compromised machines or so called "zombies" or "bots", in order to flood the target with the packets simultaneously, which forms a Distributed Denial of Service (DDoS) attack. The earliest occurrence of DDoS attack in internet can be traced back to June, 1998. However DoS attacks in the form of Internet Control Message Protocol (ICMP) or Ping flood was known to network research community in 1980s. Nowadays, N-to-1 DDoS attacks are initiated by the help of widely distributed, connected botnets or zombies that simultaneously send a huge amount of traffic to a target machine in order to exhaust the victim's computing and networking resources and hence the victim machine becomes unavailable to serve the legitimate requests.

A system to detect and mitigate DoS and DDoS HTTP "page" flood attacks is described in US 2008/0086434. A method for detecting malicious software, comprising intercepting a request to perform an activity in a processing system, is described in U.S. Pat. No. 7,877,806.

SUMMARY

It is an object of the invention to improve the effectiveness of DDoS defence in a packet-switched network, particularly in an on-demand media platform.

According to a first aspect, it is presented a method for DDoS defence in a packet-switched network. The method is performed in a network system and comprises the steps of: measuring a plurality of network parameters in incoming network traffic; ranking the plurality of measured network parameters based on machine learning; measuring a subset of the plurality of network parameters in incoming network traffic; determining an incoming network packet to be part of a DDoS attack or not by machine learning of the subset of the plurality of network parameters; and blocking an incoming network packet when the incoming network packet is determined to be part of a DDoS attack. By creating a model that only considers the most relevant network parameters for detection of a DDoS attack, the network system can make decisions regarding possible DDoS attacks much faster and still reliable.

The method may further comprise a step of evaluating the model based on the subset of the ranked plurality of measured network parameters, and repeating the step of ranking when confidence of performance is below a threshold.

The step of building a model may further be based on external media data, the step of measuring may further measure one or more external media data parameters, the step of measuring may further measure the one or more external media data parameters, and the step of determining may further determine by the one or more external media data parameters. The step of determining may determine an incoming network packet to be part of a DDoS attack by machine learning of the subset of the plurality of network parameters, the step of determining may further check the incoming network packet to be part of expected event or not by machine learning of the one or more external media data parameters.

The network system may comprise an on-demand media platform. The on-demand media platform may comprise an IPTV framework.

The step of ranking may be based on statistical method.

The step of determining may be based on rule-based machine learning.

The method may comprise the further step of building a model based on a subset of the plurality of network parameter history data and domain linguistic rules.

According to a second aspect a network system for DDoS defence in a packet-switched network is presented. The network system comprising: a processor; and a computer program product storing instructions that, when executed by the processor, causes the network system to: measure a plurality of network parameters in incoming network traffic; rank the plurality of measured network parameters based on machine learning; measure a subset of the plurality of network parameters in incoming network traffic; determine an incoming network packet to be part of a DDoS attack or not by machine learning of the subset of the plurality of network parameters; and block an incoming network packet when the incoming network packet is determined to be part of a DDoS attack. By having a model that only considers the most relevant network parameters for detection of a DDoS attack, the network system can make decisions regarding possible DDoS attacks much faster and still reliable.

According to a third aspect a network system for DDoS defence in a packet-switched network is presented. The network system comprises: a measurement manager configured to measure a plurality of network parameters in incoming network traffic, and to measure a subset of the plurality of network parameters in incoming network traffic; a ranking manager configured to rank the plurality of measured network parameters based on machine learning; a model manager configured to build a model based on network parameter history data; a determination manager configured to determine an incoming network packet to be part of a DDoS attack or not by machine learning of the subset of the plurality of network parameters; and a traffic manager configured to block an incoming network packet when the incoming network packet is determined to be part of a DDoS attack. By having a model that only considers the most relevant network parameters for detection of a DDoS attack, the network system can make decisions regarding possible DDoS attacks much faster and still reliable.

According to a fourth aspect a computer program for DDoS defence in a packet-switched network is presented. The computer program comprises computer program code which, when run on a processor of a network system in the packed-switched network, causes the network system to: measure a plurality of network parameters in incoming network traffic; rank the plurality of measured network parameters based on machine learning; build a model based on network parameter history data; measure a subset of the plurality of network parameters in incoming network traffic; determine an incoming network packet to be part of a DDoS attack or not by machine learning of the subset of the plurality of network parameters; and block an incoming network packet when the incoming network packet is determined to be part of a DDoS attack. By having a model that only considers the most relevant network parameters for detection of a DDoS attack, the network system can make decisions regarding possible DDoS attacks much faster and still reliable.

According to a fifth aspect, it is presented a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

On-demand media platforms, such as IPTV (Internet Protocol television) platforms, process huge amounts of data packets, and DDoS (Distributed Denial of Service) defence is particularly useful therefore.

Various statistical measures of network parameters in packet-switched networks, such as variance in volume of requests, can show unusual trends and get changed significantly during a DDoS attack. Such phenomenon holds evidence in detecting a malicious anomaly in the network.

Network traffic has been increasing so sharply that, not all available network parameters should be used for an effective analysis. Also administrators of a network system will have difficulty in investigating the state of the network system without expert domain knowledge. Therefore, an automated and adaptive system for network forensics is needed. Machine learning-based defence systems show promise in this regard. However, an issue in using machine learning-based detection is the availability of sufficient labelled data for classification.

In DDoS scenarios, it is practically not possible to have a sufficient labelled dataset for machine learning a system. Other challenges include handling multi-variate time-series data for building a statistical model. Selection of a set of input features that will provide useful and significant information about the incoming traffic is also an obstacle. There exist no standardized set of input features. Further, existing valuable domain inputs are often in the form of linguistic rules. Finally, in the case of a media domain it may also be possible to use open/public data in a machine learning system. If a particular media resource like a world-cup football final match is popular, then a higher traffic can be expected for it and may be used to predict a possible flash crowd during a telecast time.

For next generation pay TV solutions, services are exposed to a wide range of remote clients. These clients may have deficient protection against hostile take-over, which can increase the use of DDoS attacks. A defence mechanism is needed to prevent DDoS attacks generated from compromised client devices.

Complex algorithms and mathematical models used can lead to high computational effort and considerable delay in real time detection. A simple yet robust defence method, suitable for systems having elements of uncertainty is needed. A rule-based system is appropriate in this scenario and the rules may be extracted mathematically from available domain specific, numerical data along with linguistic information from manual inputs.

Also, a DDoS defence should be able to handle noisy inputs to generate smooth control function despite a wide range of input variations. Again rule-based systems may extract rules from a limited number of parameters of input data. Selecting and ranking significant input parameters and defining inference rules from those parameters are also challenging tasks for rule-based systems.

A statistical method is described herein, which can utilize a small amount of example attack data that can be obtained from history data and domain input rules for building a defence model.

Since energy distribution variance is common during a DDoS attack in a packet-switch network, wavelet transform analysis may be used to extract information about the energy content of packets. Though wavelet based systems attempt to make detection decisions in real time, their sliding sampling windows affects the performance. The complicated detection and modelling methodology increases computational overheads. Such techniques are further not particularly suitable to the IPTV media domain.

Besides DDoS attacks, disruption of the services and availability of web based resources can also be happened due to flash crowds. Differentiating between DDoS attacks and flash crowd scenarios is useful. Flash crowd requests are generally generated due to sudden surge of incoming requests from legitimate users for a particular period and network server resources may get exhausted to serve the requests. Flash crowd request should however be served as well as possible. A DDoS attack generates illegal requests to devastate services and should be prevented as well as possible. A flash crowd can be predictable as well as unpredictable and different measures may be taken to handle this. Apart from statistically analysing input traffic data to detect a flash crowd, available social media data may also be utilized for predicting flash crowd by buzz/sentiment analysis.

DDoS defence presented herein is flexible, adaptive and probabilistic rule-based. The DDoS defence presented herein may detect a DDoS attack from the anomaly in statistical behaviour of network parameters.

In contrast to existing systems, DDoS defence presented herein aims to provide comprehensive and flexible rule selection from numerical data and linguistic notions for a user-defined case with less computational overhead. All available network parameters need not be considered to generate rules as more parameters make the system more complex. Hence, a method presented herein may rank network parameters according to their significance for the application area and may extract data from the set of these most significant parameters that can provide information about the anomaly.

Detection of a DDoS attack may be a two-class classification problem where system's behavioural pattern is classified as 'normal' and 'anomalous' categories. Here the classification may be made based upon probabilistic rules generated from numerical data and linguistic expressions. A classification object may be partially in a classification set and its membership in that classification set may vary between 0 and 1. Hence if an object has degree of membership of 0.6 in a set, then that object belongs to that set by 0.6 degree and does NOT belong to that set by 0.4 degree. An object may belong to multiple sets at the same time when differences between classes are not well defined. Use of such a two-class classification may be used in defining DDoS defence when differences between normal and anomalous traffic is uncertain. Linguistic variables may be derived to define input parameters that indicate anomalous in network traffic.

A rule may consider the degree of membership of a number of input parameters and infer a classification. An example of a rule may be e.g.:
IF x is HIGH and y is MEDIUM-LOW and z is LOW then output pattern is NORMAL HIGH, LOW, MEDIUM-LOW are here linguistic variables and may be quantified according to membership of these input parameters to the corresponding classification sets. The membership is defined between 0 and 1.

Pattern of requests, entropy of clients' distribution, frequency of requests, entropy of requested resources, protocol specific requests, packet timeline etc. can be greatly affected and their statistical nature may deviated during a DDoS attack, and network parameters thereof may thus be used to detect a DDoS attack. Network traffic patterns are self-similar irrespective of network type, topology, application area etc. Deviations of this self-similar nature in anomalous traffic from a normal traffic may thus be useful in detecting a DDoS attack.

A DDoS defence method presented herein may generate rules from numerical data and linguistic notions to detect DDoS attack. System performance may be monitored based on selected KPIs (Key Performance Indicators) that are most significant in detecting the anomaly and are affected most by the attack traffic. As KPIs deviates from a predicted level, or target level, probabilistic rules may decide whether those deviations are from an anomalous traffic or from normal traffic. Rules may be defined for individual KPIs, from available domain specific data. Linguistic notions from manual input may be used and membership functions for each variable in a rule may be defined for those linguistic expressions. A collection of probabilistic sets, i.e. probabilistic space, may define these probabilistic linguistic values or classes that an object can belong to.

Though a DDoS attack contains several similar characteristics of flash crowd, a method presented herein is able to detect and to differentiate between a DDoS attack and a flash crowd. The prediction of a predictable flash crowd may be made beforehand by analysing external open/public media specific data available in e.g. social media, which indicates possible surges of incoming traffic during e.g. the most trendy or popular programs/events. Though such an social media analysis is not a part of a real time defence it may be added as a complementary rule that indicates possible flash crowd in advance so that service providers can take necessary measures of additional resources. For an unpredictable flash crowd, the system differentiates this situation from a DDoS attack by statistically analysing incoming network packets. The entropy of clients' distribution, requests rate and requested resources depicts patterns for differentiating a flash crowd from a DDoS attack.

An on-demand media platform that is a software-defined, media-optimized, end-to-end cloud based framework for managing and delivering next generation pay TV services across the network (managed/unmanaged or mobile/fixed), may be suitable for implementation of a DDoS defence system presented herein. The on-demand media platform may support an extensive range of devices.

A DDoS defence system presented herein may handle a less, to no, supervision scenario. It may also work with a large number of time-series parameters, leveraging both domain rules and open information about media resources. It ensures effective real time detection of a DDoS attack and can also able to differentiate a DDoS attack from a flash crowd in a network system.

The DDoS defence system presented herein provides an inherently robust system since it does not require precise, noise-free inputs. Hence it is suitable for integrating with nonlinear systems and new systems having elements of uncertainty, to adaptively determine the attack. Output from the system is a smooth control function despite a wide range of input variations.

Figure 1:
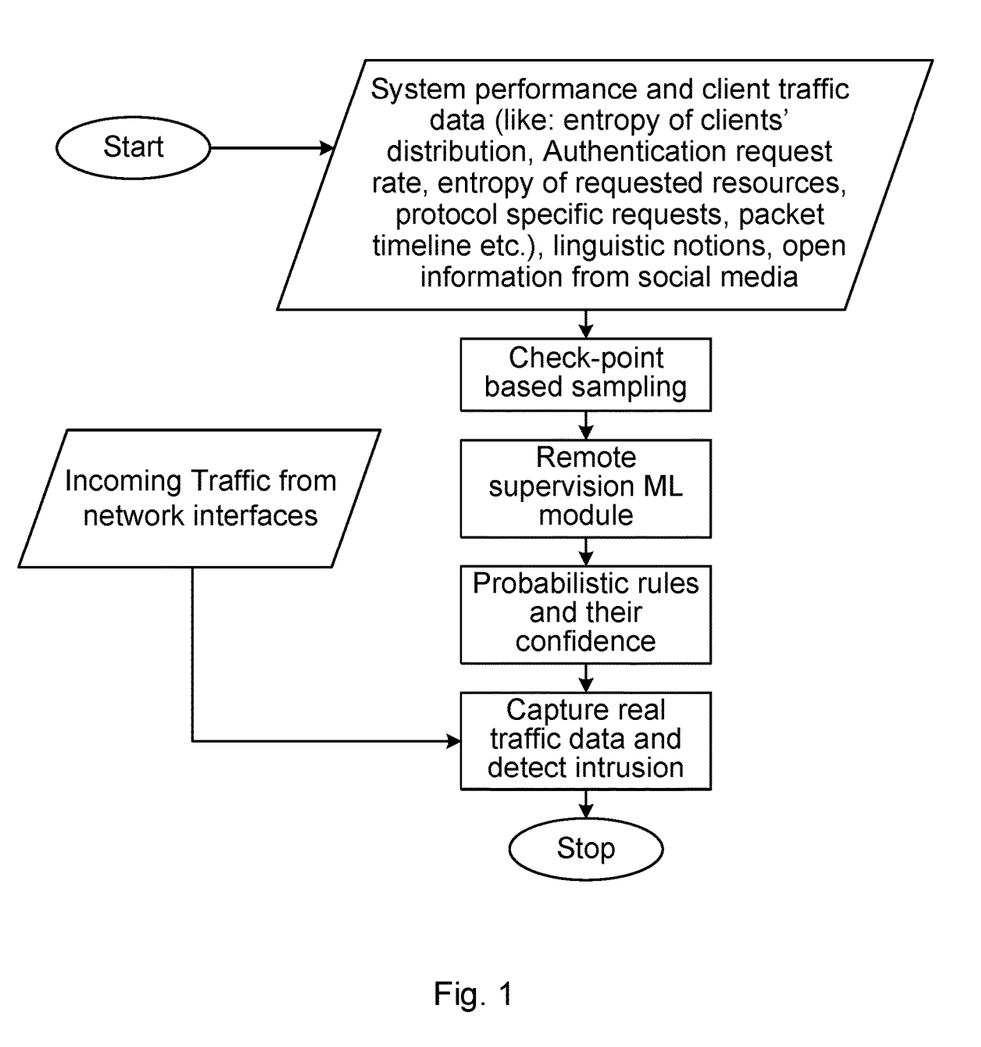
FIG. 1 is a schematic flow chart illustrating high level functionality for DDoS defence.
Figure 2:
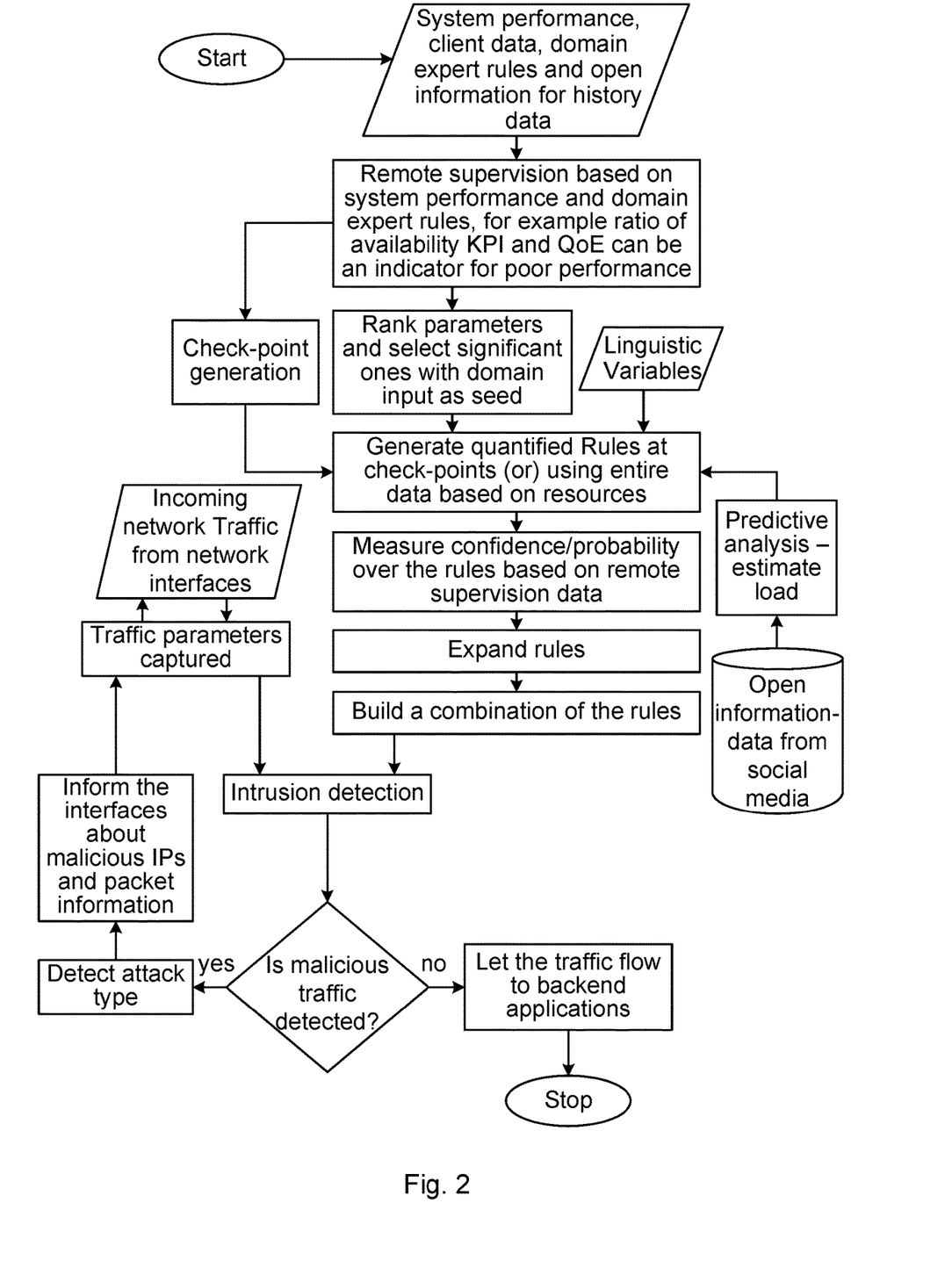
FIG. 2 is a schematic flow chart illustrating detailed functionality for DDoS defence.

FIG. 1 shows a high level functionality of the DDoS defend system, and FIG. 2 shows a detailed functionality of the DDoS defend system.

The DDoS defence system is presented herein, which uses network system KPI data, user client information, domain rules and external, open information. A model is built using un-annotated history data. Network system performance, such as a ratio between KPI and QoE (quality of experience), may be used as a proxy for supervision of the system. Various parameters such as window size and thresholds will be tuned using history data.

The DDoS defence system presented herein may use a combination of system performance, client traffic data, domain linguistic rules and external open data. System performance may be monitored using KPIs. Our objective is to maintain it at a target level. Client traffic data may comprise HTTP request, frequency of requests, resource requested, location, time and other HTTP header parameters. External open data may be on resource popularity that can be used as a prior source of information to differentiate between a legitimate traffic pattern and an attack.

Measuring System Performance (Using KPIs Pattern Over Time)

IPTV services may be offered by piggy-backing TV services on existing Internet infrastructure functioning with the TCP/IP protocol suite. Client side Quality of Service and server side network KPIs related to the TCP/IP protocol suite, as well as media domain specific KPIs, get affected by anomalous traffic in the network. Hence, by statistically analyzing system performance based upon the KPIs, an adaptive defence system can be designed to detect and defend an IPTV platform from a DDoS attack. When IPTV services are provisioned to be accessed from platform independent clients, the possibility of having compromised clients is also high, which may help attackers in creating a DDoS attack. Even if a core IPTV platform recognizes and identifies remote clients and communicates with trusted clients by control messages, attackers may try to stop or capture information of control messages to reconfigure existing network elements. Signaling information from controlling messages from identified clients becomes vulnerable and may lead to a DDoS situation. Once clients are compromised, an authentication server at a core IPTV framework can be flooded with huge number of false requests. Session Initiation Protocol (SIP) is used to authenticate users for session and media control. SIP utilizes a plaintext based request-response paradigm, like HTTP (Hypertext Transfer Protocol), and maintains a state at a server and can be exploited by attackers by payload tampering and message flow tampering attacks. The server side becomes flooded by an unusual number of channel requests and as the traffic becomes massive the core services become inaccessible from client side. Besides SIP infrastructure, other elements related to SIP like DNS (Domain Name System), gateways, RTP (Real-time Transport Protocol) proxies etc. are also affected by a DDoS attack.

In a DDoS system, traffic samples are captured in regular intervals (for example: every 5 minutes) and the key traffic KPIs are measured and analyzed to detect an anomaly in the IPTV platform. Apart from a significant surge in the traffic volume, due to e.g. a bot based attack, number of clients and distribution of clients (source IP (Internet Protocol) addresses) also show an anomalous pattern unlikely to their standard nature. For a DDoS scenario, even though sources are distributed the distribution is less skewed and their randomness or entropy becomes an important factor. Also, the requested resources show a specific pattern as a large set of distributed clients start requesting a particular type of resource (clustered requests) over a period of time. Media specific KPIs show a pattern that needs to be analyzed to detect a DDoS attack, and the presented probabilistic rule-based defence system generates rules out of the network KPIs to monitor the traffic flow and to detect an attack. Apart from media specific domain data, external open data available from e.g. social media may also be used to predict a possible occurrence of a flash crowd in a near future.

Client Data Monitoring Over Time (Attributes Measured Over Time):

A DDoS attack is not a single kind of attack but a general term of different kinds of attack strategies that exploit loopholes in existing security systems and protocols to disrupt network system resources with overwhelming number of packets. DDoS attack types comprises volumetric attacks, TCP State-Exhaustion Attacks and Application Layer Attacks.

Volumetric Attacks (connectionless) are also known as "floods". The goal of this type of attack is to cause congestion and send so much traffic that it overwhelms the bandwidth of the attacked site. Attacks are typically executed using botnets, an army of computers infected with malicious software and controlled as a group by the attacker.

TCP State-Exhaustion Attacks focuses on actual web servers, firewalls and load balancers to disrupt connections, resulting in exhausting their finite number of concurrent connections the device can support.

Application Layer Attacks (connection-based), also known as Layer 7 attacks, specifically targets weaknesses in an application or server with the goal of establishing a connection and exhausting it by monopolizing processes and transactions.

Even if data collected from network parameters can be considered as a weakly stationary time-series, it can be concluded that network parameters are self-similar in nature regardless of the network type, protocols, topology and packet size. Network parameters are selected that changes significantly during an attack phase and which patterns give an important clue to detect DDoS attacks from normal traffic. The entropy of clients' distribution in the network, packet rate, the Hurst parameter calculated over packet distribution, entropy of requested resources, protocol specific request rate, packet timeline etc. provide information about the DDoS attack. Significant divergence of these parameters shows an attack in network traffic. This divergence can be measured by the concept of entropy as it depicts the randomness or uncertainty of information. Shannon's theorem depicts the entropy if an information source is having n independent symbols, each with a probability of choice $P_i$. These domain specific KPIs may be measured from incoming traffic flowing at an IPTV platform. The DDoS defence system can captures the traffic data from a network interface or from border routers of the core system where data from distributed clients are coming. Data from multiple interfaces may then be analyzed to detect the anomaly.

Packet Rate is Calculated in the Following Way:

$$R(protcol\ P)_i = \frac{\text{Total number of incoming packets of protocol } P_i}{\text{Total number of } IP \text{ packets}}$$

$$R(protcol\ P)_o = \frac{\text{Total number of outgoing packets of protocol } P_o}{\text{Total number of } IP \text{ packets}}$$

The Hurst parameter is a mathematically well-defined index to measure the degree of self-similarity in a wide range of networks. Therefore, accurate and rapid estimation of the Hurst parameter is required to detect anomaly in real time network traffic. The calculation of the Hurst parameter can be done by the following R/S estimation:

$$\frac{R_n}{S_n} \approx Cn^H$$

Here C is a positive, finite constant independent of n and H is the Hurst Parameter. $S_n$ is the Standard Deviation and $R_n$ is the range of n successive values:

$$R_n = \min_{k \leq n}(X_k - \hat{X}_k) - \max_{k \leq n}(X_k - \hat{X}_k)$$

wherein $X_k$: k=1, 2 . . . n represents the values of n successive observed values of a time series X in incoming traffic and $\hat{X}_k$ is the expectation of $X_k$.

Resource popularity estimation may be used for open data, external from a network server. The external information may be used to disambiguate between real popularity, such as a flash crowd, and a DDoS attack.

Popularity of a media resource may be measured by computing the relative frequency of a resource item R compared to other resources in a window of time W before show time for the resource item R. The window may be infinite, for a single event such as a world-cup final, or tunable based on other cases, for example, a weekly show.

$$\text{Popularity}(R, W) = \frac{\text{\# of mentions of } R \text{ within } W}{\text{\# of mentions of all resources within } W}$$

In order to compute this popularity of a media resource item, as many open media related sources as possible are monitored, such as Twitter lists, Facebook groups, Twitter entity mentions. The parameter W can be empirically tunable or can be given as user input.

Domain rules may be put together with data as described in the following.

A linguistic rule may be set up by finding nouns, adjectives and adverbs. For a rule "number of connections from a client with subscription type XXX is less on weekdays" XXX, less and weekdays are extracted. With the use of history data linguistic rules may be quantified.

Parameters which have a high correlation with parameters mentioned in linguistic rules are selected. The selection may use a technique called cross-correlation between two time-series attributes.

The adverbs and adjectives are quantified from client traffic data by computing the range of values for those attributes that are the most probable argmax $\Theta$ (range, D), wherein $\Theta$ is the likelihood (argmax denotes the argument of the maximum). The computation may use a simple line search wherein the range width D is linearly increased to validate the effectiveness. The computation quantifies the range of various attributes mentioned in the linguistic rules. The function $\Theta$, takes different range values and data, and returns a value which quantifies the utility. One example utility function $\Theta$ can be, geometric mean of accuracy with respect to attack classification 'A' and normal traffic classification 'N', $(A*N)^{1/2}$. Different range values may be varied in steps and the best range may be chosen.

If the system performance KPI is forecasted to degrade in a future instance of time, the model may be updated. The forecast may use linear regression or a forecast model such as ARIMA (autoregressive integrated moving average). A KPI value at a time $t_{w+1}$ may be predicted from the values of KPI at time $t_w$ and less. If the value is less than a threshold, then the model may be updated by monitoring network traffic. Additional check pointing may be based on traffic pattern forecasted values for different resource items. E.g. user client traffic parameters anomaly may be used as an additional indicator.

The range values may be updated further using parameters in the check pointing such that the range maximizes the likelihood.

The rules may be evaluated by measuring the performance. Based on the ratio of average system performance and QoE over a period of time, the probability of the rules which measures confidence of their performance in real-time (Rule|Performance Ratio) is estimated, where the Performance Ratio includes traffic data that satisfies a predefined value.

Confidence of a combination of rules, rather than confidence of individual rules as mention above is contemplated. A function to combine individual prediction may e.g. be linear, $W^T*R$, where $W^T$ is the transpose of row matrix (vector) of individual weights of the individual rules and R is the individual rules predictions. It may also be non-linear function over individual rules' prediction.

The model is now trained and ready to be fed with real-time incoming traffic data from a network interface and the system can decide whether an attack is going on or not. If a DDoS attack is traced then its intensity may be detected from calculating a probability value from the model.

Network interfaces, or border routers, are informed about the attack type (packet information) and malicious source IP addresses to drop (block) the packets.

Figure 4:
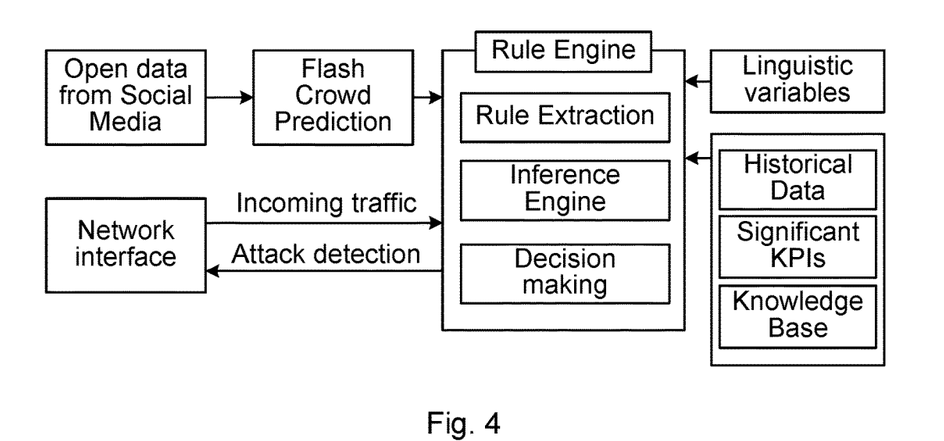
FIG. 4 is a schematic drawing illustrating a high level diagram for DDoS defence.

FIG. 4 shows a basic architecture of the DDoS defence system. Historical data and linguistic variables are used to develop the rule base. First the DDoS defence system ranks significant network parameters from a number of available input parameters and then generates probabilistic decision rules from numerical data. The input data are put in the range of probabilistic sets and a degree of membership is defined. The inference engine makes the decision from incoming traffic, determines an output and generates a well-defined value. If a DDoS attack is detected, the DDoS defence system takes the corrective action by communicating with network interfaces about malicious source, packet type to block requests from the source temporarily.

Figure 5:
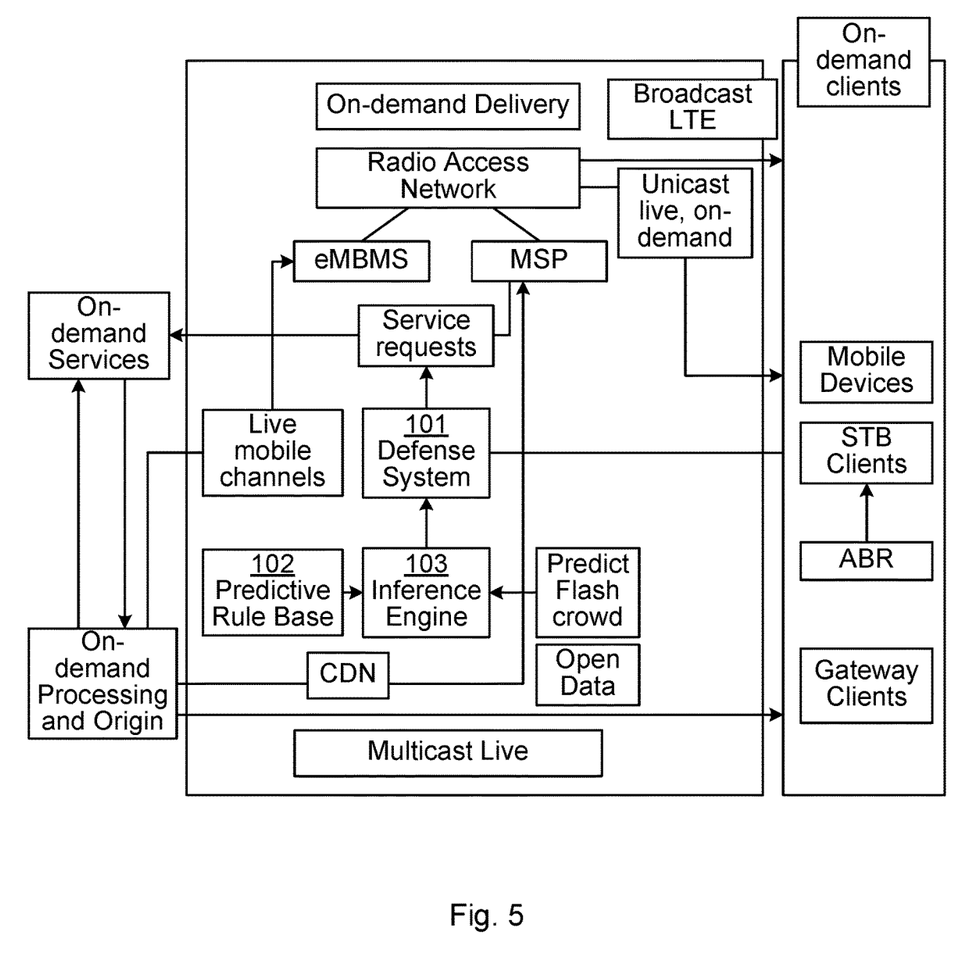
FIG. 5 is a schematic drawing illustrating a DDoS defence integrated into an on-demand system.

FIG. 5 shows integration of the DDoS system with an on-demand media platform, particularly for IPTV. On-demand Services provide on-demand provisioning and customization of managed services for operators. On-demand Processing is a video preparation and orchestration framework in which video content is prepared for live, VOD (Video On Demand) and IPTV services across all devices. On-demand clients support an extensive range of mobile devices. On-demand Content Controller is an extension of SDN (Software Defined Network) that includes content delivery network and caching functions for traffic and data delivery optimizations.

The probabilistic decision, rule-based DDoS defence system may be placed as a node 101 in the on-demand delivery module. A rule base 102 is generated from numerical data and linguistic variables and an inference engine 103 is developed. As compromised clients are vulnerable to be used as a DDoS attack source, service requests from clients are verified and inspected before being allowing reaching next level applications.

The solution provides a probabilistic rule-based adaptive system for controlling anomalous service requests from clients for an IPTV platform where services are exposed to a wide range of mobile clients. Client devices can be vulnerable and can be used to launch DDoS attack towards the core of IPTV platform. This adaptive solution is flexible enough to select the input parameters to monitor for the anomaly and may be tweaked as per application area.

The solution offers ranking of the input parameters according to their significance and selecting a limited number of significant parameters only to detect the anomaly as all the parameters need not be considered to avoid high complexity and computational expense. The solution also mathematically generates inference rules from numerical training data and linguistic variables to be used as a rule base in real time detection.

Figure 3A:
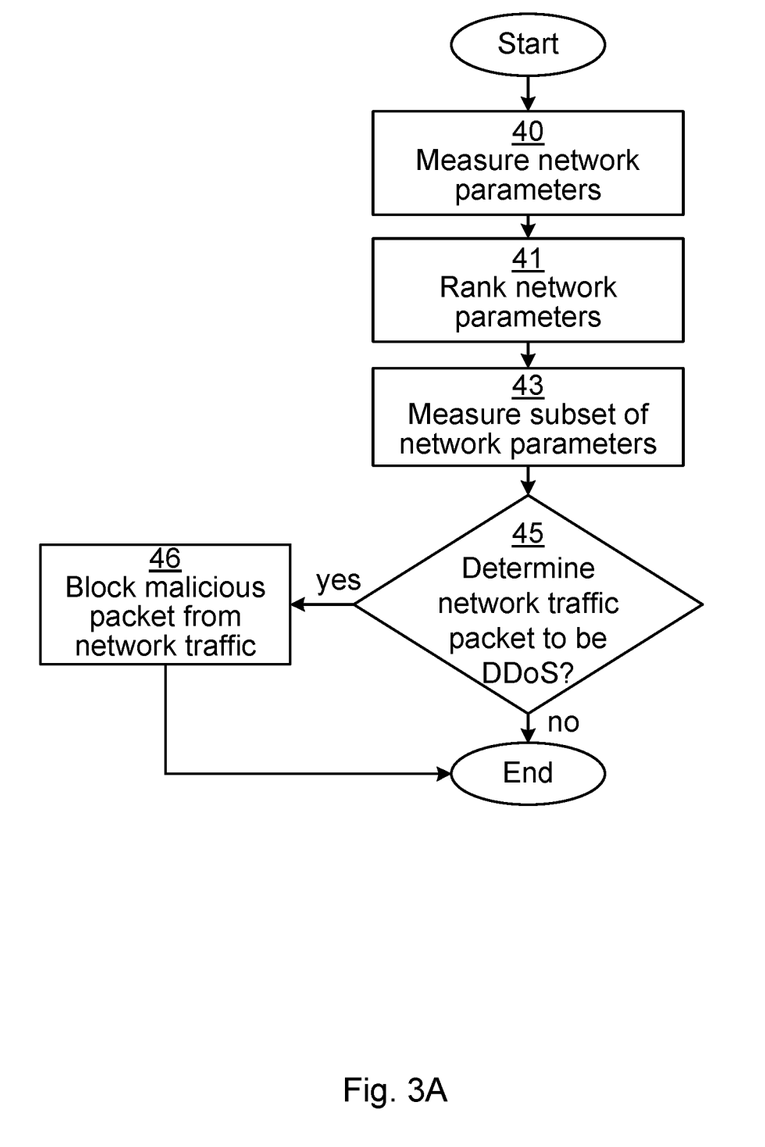
FIGS. 3A-B are flow charts illustrating methods for embodiments presented herein.

A method for DDoS defence in a packet-switched network is presented with reference to FIG. 3A. The method is performed by a network system 20 and comprises the steps of: measuring 40 a plurality of network parameters in incoming network traffic; ranking 41 the plurality of measured network parameters based on machine learning; measuring 43 a subset of the plurality of network parameters in incoming network traffic; determining 45 an incoming network packet to be part of a DDoS attack or not by machine learning of the subset of the plurality of network parameters; and blocking 46 an incoming network packet when the incoming network packet is determined to be part of a DDoS attack. The step of measuring 43 may be performed on real-time incoming network traffic. The step of building 42 a model may be based also on the ranked network parameters.

Figure 3B:
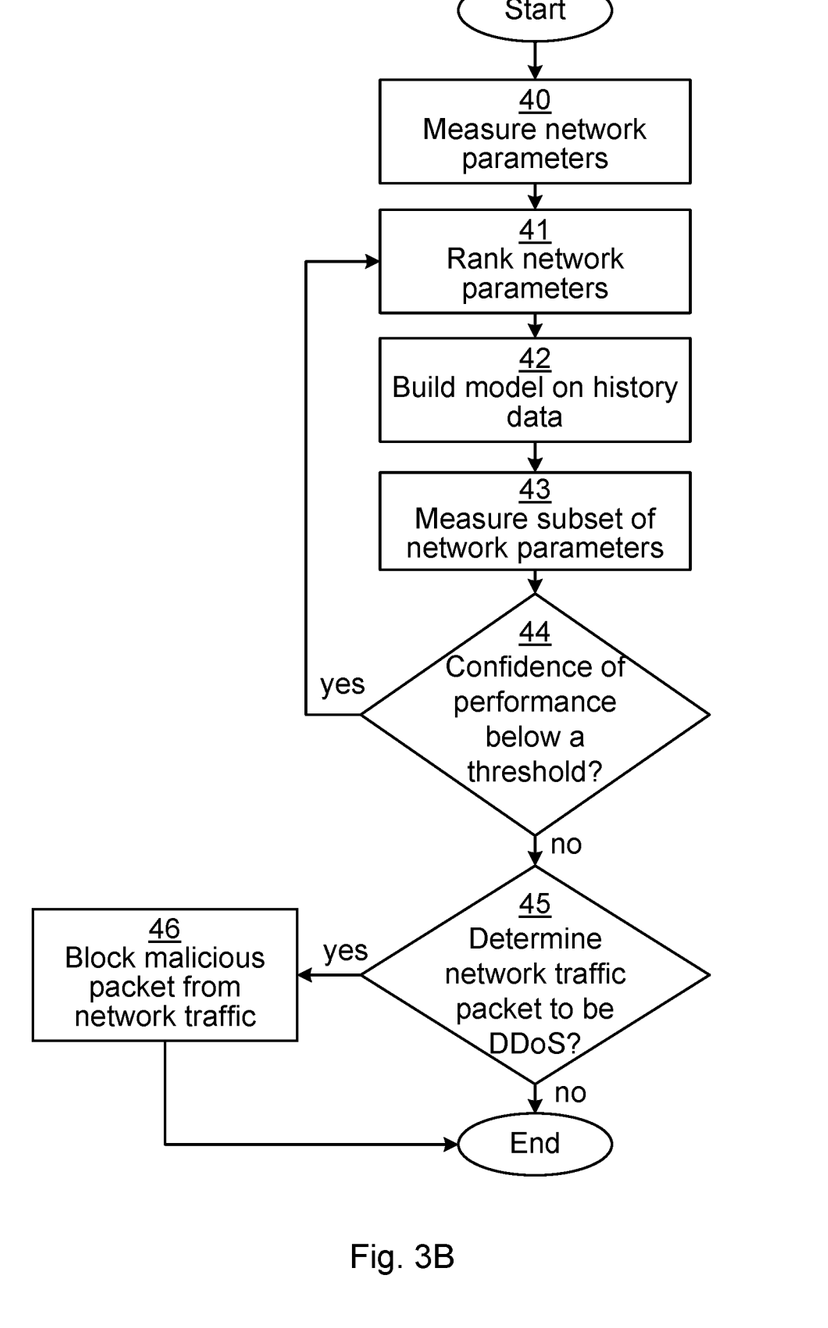

The method may comprise further steps, which is illustrated in FIG. 3B. The method may further comprising a step of evaluating 44 the model based on the subset of the ranked plurality of measured network parameters, and repeating the step of ranking 41 when confidence of performance is below a threshold.

The method may comprise a further step of building 42 a model based on a subset of the plurality of network parameter history data and domain linguistic rules.

The step of building 42 a model may further be based on external media data, the step of measuring 40 may further measure one or more external media data parameters, the step of measuring 43 may further measure the one or more external media data parameters, and the step of determining 45 may determines further by the one or more external media data parameters. The step of determining 45 may determine an incoming network packet to be part of a DDoS attack by machine learning of the subset of the plurality of network parameters, the step of determining 45 further checks the incoming network packet to be part of expected event or not by machine learning of the one or more external media data parameters.

The network system may comprise an on-demand media platform, preferably comprising an IPTV framework.

The step of determining 45 may be based on rule-based machine learning. The step of ranking 41 may be based on statistical methods.

Figure 6:
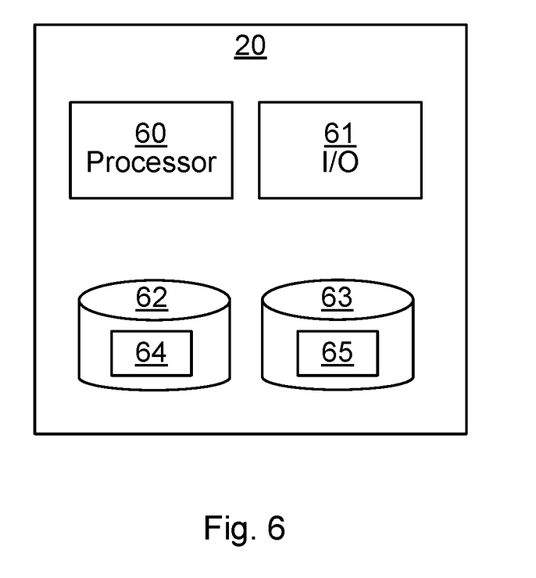
FIG. 6 is a schematic diagram illustrating some components of a network system.

A network system 20 for DDoS defence in a packet-switched network is presented with reference to FIG. 6. The network system 20 comprises: a processor 60; and a computer program product 62, 63 storing instructions that, when executed by the processor 60, causes the network system 20 to: measure 40 a plurality of network parameters in incoming network traffic; rank 41 the plurality of measured network parameters based on machine learning; measure 43 a subset of the plurality of network parameters in incoming network traffic; determine 45 an incoming network packet to be part of a DDoS attack or not by machine learning of the subset of the plurality of network parameters; and block 46 an incoming network packet when the incoming network packet is determined to be part of a DDoS attack. The step of measure 43 may be performed on real-time incoming network traffic. The instructions may further cause the network system to build 42 a model based on the subset of the plurality of network parameter history data and domain linguistic rules.

The network system may further comprise an instruction to evaluate 44 the model based on the subset of the ranked plurality of measured network parameters, and repeating the instruction to rank 41 when confidence of performance is below a threshold.

The instruction to build 42 a model may further be based on external media data, the instruction to measure 40 may further measure one or more external media data parameters, the instruction to measure 43 may further measure the one or more external media data parameters, and the instruction to determine 45 may determine further by the one or more external media data parameters. When the instruction to determine 45 determines an incoming network packet to be part of a DDoS attack by machine learning of the subset of the plurality of network parameters, the instruction to determine 45 may further checks the incoming network packet to be part of expected event or not by machine learning of the one or more external media data parameters.

The network system may comprise an on-demand media platform, preferably comprising an IPTV framework.

The instruction to rank 41 may be based on statistical method, and the instruction to determine 45 may be based on rule-based machine learning. The step of instruction to rank 41 may be based on statistical methods.

FIG. 6 shows some components of the network system 20. The processor 60 may be provided using any combination of one or more of a suitable central processing unit, CPU, multiprocessor, microcontroller, digital signal processor, DSP, application specific integrated circuit etc., capable of executing software instructions of a computer program 64 stored in a memory. The memory can thus be considered to be or form part of the computer program product 62. The processor 60 may be configured to execute methods described herein with reference to FIGS. 3A-3B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 63 in the form of a data memory may also be provided, e.g. for reading and/or storing data during execution of software instructions in the processor 60. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g. hold other software instructions 65, to improve functionality for the network system 20.

The network system 20 may further comprise an input/output, I/O, interface 61 including e.g. a user interface. The network system may further comprise a receiver configured to receive signalling from a second system and/or from a third system, and a transmitter configured to transmit signalling to the second system and/or to the third system (not illustrated). Other components of the network device are omitted in order not to obscure the concepts presented herein.

Figure 7:
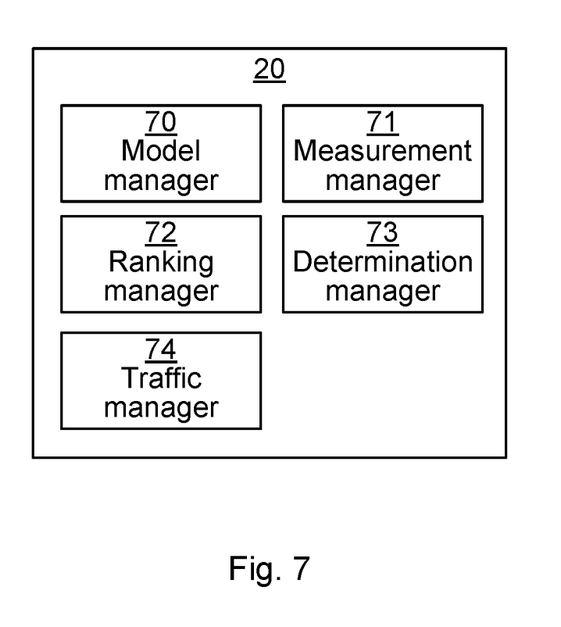
FIG. 7 is a schematic diagram showing functional module of a network system.

A network system 20 for DDoS defence in a packet-switched network is presented with reference to FIG. 7. The network system 20 comprises: a measurement manager configured to measure 40 a plurality of network parameters in incoming network traffic, and to measure 43 a subset of the plurality of network parameters in incoming network traffic; a ranking manager configured to rank 41 the plurality of measured network parameters based on machine learning; a determination manager configured to determine 45 an incoming network packet to be part of a DDoS attack or not by machine learning of the subset of the plurality of network parameters; and a traffic manager configured to block 46 an incoming network packet when the incoming network packet is determined to be part of a DDoS attack. The step of measure 43 may be performed on real-time incoming network traffic. The network system may further comprise a model manager configured to build 42 a model based on the subset of the plurality of network parameter history data and domain linguistic rules.

FIG. 7 shows functional blocks of the network system 20. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIGS. 3A-3B, comprising a model manager unit 70, a measurement manager unit 71, a ranking manager unit 72, a determination manager unit 73 and a traffic manager unit 74. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The model manager 70 is for building a model based on network parameter history data. This module corresponds to the build step 42 of FIGS. 3A-3B. This module can e.g. be implemented by the processor 60 of FIG. 6, when running the computer program.

The measurement manger 71 is for measuring network parameters in incoming network traffic. This module corresponds to the measurement step 40, and the measurement step 43 of FIGS. 3A-3B. This module can e.g. be implemented by the processor 60 of FIG. 6, when running the computer program.

The ranking manger 72 is for ranking measured network parameters. This module corresponds to the ranking step 41 of FIGS. 3A-3B. This module can e.g. be implemented by the processor 60 of FIG. 6, when running the computer program.

The determination manger 73 is for determining if an incoming network packet is part of a DDoS attack or not. This module corresponds to the determination step 45 of FIGS. 3A-3B. This module can e.g. be implemented by the processor 60 of FIG. 6, when running the computer program.

The traffic manger 74 is for controlling incoming network packets. This module corresponds to the blocking step 46 of FIGS. 3A-3B. This module can e.g. be implemented by the processor 60 of FIG. 6, when running the computer program.

A computer program 64, 65 for DDoS defence in a packet-switched network is presented. The computer program comprises computer program code which, when run on a processor of a network system 20 in the packed-switched network, causes the network system 20 to: measure 40 a plurality of network parameters in incoming network traffic; rank 41 the plurality of measured network parameters based on machine learning; measure 43 a subset of the plurality of network parameters in incoming network traffic; determine 45 an incoming network packet to be part of a DDoS attack or not by machine learning of the subset of the plurality of network parameters; and block 46 an incoming network packet when the incoming network packet is determined to be part of a DDoS attack. A computer program product 62, 63 comprising a computer program 64, 65 and a computer readable storage means on which the computer program 64, 65 is stored, is also presented. The step of measure 43 may be performed on real-time incoming network traffic. The network system may further be caused to build 42 a model based on the subset of the plurality of network parameter history data and domain linguistic rules.

A first portion of the instructions performed by the network system 20 may be executed in a first device, and a second portion of the of the instructions performed by the network system 20 may be executed in a second device; the herein disclosed embodiments are not limited to any particular number of devices on which the instructions performed by the network system 20 may be executed. Hence, the methods according to the herein disclosed embodiments are suitable to be performed by a network system 20 residing in a cloud computational environment.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for DDoS defence in a packet-switched network, the method being performed by a network system, the method comprising:
measuring a plurality of network parameters in incoming network traffic;
ranking the plurality of measured network parameters based on machine learning;
measuring a subset of the plurality of network parameters in incoming network traffic;
determining a flash crowd event based at least on external media data, the flash crowd event indicating a sudden surge in incoming requests from legitimate users for a predetermined period of time, the flash crowd event having at least one characteristic;
determining a first entropy of client distribution in the packet-switched network and a second entropy of requested resources based at least in part on the flash crowd event;
determining whether an incoming network packet is part of a DDoS attack based on machine learning of the subset of the plurality of network parameters, the at least one characteristic of the flash crowd event, the first entropy, and the second entropy; and
blocking an incoming network packet when the incoming network packet is determined to be part of a DDoS attack.

2. The method according to claim 1, further comprising evaluating a model based on the subset of the ranked plurality of measured network parameters, and repeating the step of ranking when confidence of performance is below a threshold.

3. The method according to claim 1, further comprising building a model based on the external media data, wherein the measuring the plurality of network parameters in incoming network traffic further measures one or more external media data parameters, the measuring the subset of the plurality of network parameters in incoming network traffic further measures the one or more external media data parameters, and the determining further determines using the one or more external media data parameters.

4. The method according to claim 1, wherein, when the determining determines an incoming network packet to be part of a DDoS attack by machine learning of the subset of the plurality of network parameters, and the determining further checks whether the incoming network packet is part of an expected event by machine learning of the one or more external media data parameters.

5. The method according to claim 1, wherein the network system comprises an on-demand media platform.

6. The method according to claim 5, wherein the on-demand media platform comprises an IPTV framework.

7. The method according to claim 1, wherein the ranking is based on a statistical method.

8. The method according to claim 1, wherein the determining is based on rule-based machine learning.

9. The method according to claim 1, further comprising building a model based on a subset of the plurality of network parameter history data and domain linguistic rules.

10. A network system for DDoS defence in a packet-switched network, the network system comprising:
a processor; and
a computer storage medium storing instructions that, when executed by the processor, causes the network system to:
measure a plurality of network parameters in incoming network traffic;
rank the plurality of measured network parameters based on machine learning;
measure a subset of the plurality of network parameters in incoming network traffic;
determine a flash crowd event based at least on external media data, the flash crowd event indicating a sudden surge in incoming requests from legitimate users for a predetermined period of time, the flash crowd event having at least one characteristic;
determine a first entropy of client distribution in the packet-switched network and a second entropy of requested resources based at least in part on the flash crowd event;
determine whether an incoming network packet is part of a DDoS attack based on machine learning of the subset of the plurality of network parameters, the at least one characteristic of the flash crowd event, the first entropy, and the second entropy; and
block an incoming network packet when the incoming network packet is determined to be part of a DDoS attack.

11. The network system according to claim 10, further comprising an instruction to evaluate a model based on the subset of the ranked plurality of measured network parameters, and repeating the instruction to rank when confidence of performance is below a threshold.

12. The network system according to claim 10, further comprising an instruction to build a model based on the external media data, the instruction to measure the plurality of network parameters in incoming network traffic further measures one or more external media data parameters, the instruction to measure the subset of the plurality of network parameters in incoming network traffic further measures the one or more external media data parameters, and the instruction to determine further determines using the one or more external media data parameters.

13. The network system according to claim 10, wherein, when the instruction to determine determines an incoming network packet to be part of a DDoS attack by machine learning of the subset of the plurality of network parameters, and the instruction to determine further checks whether the incoming network packet is part of an expected event by machine learning of the one or more external media data parameters.

14. The network system according to claim 10, wherein the network system comprises an on-demand media platform.

15. The network system according to claim 10, wherein the instruction to rank is based on a statistical method.

16. The network system according to claim 10, wherein the instruction to determine is based on rule-based machine learning.

17. The network system according to claim 10, further comprising an instruction to build a model based on a subset of the plurality of network parameter history data and domain linguistic rules.

18. A network system for DDoS defence in a packet-switched network, the network system comprising:
a measurement manager configured to measure a plurality of network parameters in incoming network traffic, and to measure a subset of the plurality of network parameters in incoming network traffic;
a ranking manager configured to rank the plurality of measured network parameters based on machine learning;
a determination manager configured to:
determine a flash crowd event based at least on external media data, the flash crowd event indicating a sudden surge in incoming requests from legitimate users for a predetermined period of time, the flash crowd event having at least one characteristic;
determine a first entropy of client distribution in the packet-switched network and a second entropy of requested resources based at least in part on the flash crowd event; and
determine whether an incoming network packet is part of a DDoS attack based on machine learning of the subset of the plurality of network parameters, the at least one characteristic of the flash crowd event, the first entropy, and the second entropy; and
a traffic manager configured to block an incoming network packet when the incoming network packet is determined to be part of a DDoS attack.

19. A computer storage device storing a computer program for DDoS defence in a packet-switched network, the computer program comprising computer program code which, when run on a processor of a network system in the packed-switched network, causes the network system to:
measure a plurality of network parameters in incoming network traffic;
rank the plurality of measured network parameters based on machine learning;
measure a subset of the plurality of network parameters in incoming network traffic;
determine a flash crowd event based at least on external media data, the flash crowd event indicating a sudden surge in incoming requests from legitimate users for a predetermined period of time, the flash crowd event having at least one characteristic;

determine a first entropy of client distribution in the packet-switched network and a second entropy of requested resources based at least in part on the flash crowd event;

determine whether an incoming network packet is part of a DDoS attack based on machine learning of the subset of the plurality of network parameters, the at least one characteristic of the flash crowd event, the first entropy, and the second entropy; and block an incoming network packet when the incoming network packet is determined to be part of a DDoS attack.

\* \* \* \* \*